United States Patent
Sumner et al.

(10) Patent No.: US 7,562,102 B1
(45) Date of Patent: Jul. 14, 2009

(54) EXTENSIBLE HANDLING OF NEW OR MODIFIED DATA WITHIN AN INDEPENDENT DISTRIBUTED DATABASE SYSTEM

(75) Inventors: Jeffery Sumner, Oakville (CA); Duk Loi, Richmond Hill (CA)

(73) Assignee: Progress Software Corporation, Bedford, MA (US)

( * ) Notice: Subject to any disclaimer, the term of this patent is extended or adjusted under 35 U.S.C. 154(b) by 264 days.

(21) Appl. No.: 11/142,883

(22) Filed: May 31, 2005

Related U.S. Application Data (60) Provisional application No. 60/631,836, filed on Nov. 29, 2004.

(51) Int. Cl.
 *G06F 17/30* (2006.01)
(52) U.S. Cl. .................. 707/201; 707/203; 707/205; 715/229; 715/733; 715/759
(58) Field of Classification Search ................ None
 See application file for complete search history.

(56) References Cited

U.S. PATENT DOCUMENTS

| | | | | |
|---|---|---|---|---|
| 5,499,365 A | * | 3/1996 | Anderson et al. | 707/203 |
| 5,884,324 A | * | 3/1999 | Cheng et al. | 707/201 |
| 5,995,980 A | * | 11/1999 | Olson et al. | 707/201 |
| 6,029,178 A | * | 2/2000 | Martin et al. | 707/201 |
| 6,032,158 A | * | 2/2000 | Mukhopadhyay et al. | 707/201 |
| 6,092,086 A | * | 7/2000 | Martin et al. | 707/202 |
| 6,304,881 B1 | * | 10/2001 | Halim et al. | 707/201 |
| 6,446,092 B1 | | 9/2002 | Sutter | |
| 6,901,372 B1 | * | 5/2005 | Helzerman | 705/7 |
| 7,111,023 B2 | * | 9/2006 | Norcott | 707/203 |
| 7,171,432 B2 | * | 1/2007 | Wildhagen et al. | 707/203 |
| 2001/0037460 A1 | * | 11/2001 | Porcari | 713/201 |
| 2004/0010510 A1 | * | 1/2004 | Hotti | 707/103 R |
| 2004/0019634 A1 | * | 1/2004 | Van Geldern et al. | 709/203 |
| 2004/0193602 A1 | * | 9/2004 | Liu et al. | 707/9 |

* cited by examiner

*Primary Examiner*—Pierre M Vital
*Assistant Examiner*—Augustine Obisesan
(74) *Attorney, Agent, or Firm*—Fenwick & West LLP (57) ABSTRACT

Newly added, deleted, or changed data of a local storage in a distributed database system is prevented from being replicated until it has been approved via a specific process. Any new, deleted, or changed records are initially marked as being candidate data. The normal replication processing within the distributed database system ignores such data. In this way, the candidate data is not allowed to leave its source site, and potentially contaminate the rest of the replication network, until that data has been approved. The approval process is provided by a candidate data scanner that detects the candidate data and provides it to a candidate data resolver for processing. The candidate data resolver is architected to provide for per installation extensibility.

23 Claims, 3 Drawing Sheets

EXTENSIBLE HANDLING OF NEW OR MODIFIED DATA WITHIN AN INDEPENDENT DISTRIBUTED DATABASE SYSTEM

RELATED APPLICATIONS

This application claims the benefit of U.S. Provisional Application No. 60/631,836, filed on Nov. 29, 2004, which is herein incorporated in its entirety by reference.

FIELD OF THE INVENTION

The invention relates to the field of synchronizing widely distributed database systems, and more particularly, to providing for extensible handling of new or modified data within such a system.

BACKGROUND OF THE INVENTION

Databases are commonly used applications found in computing systems. A database is a collection of related information about a subject organized in a useful manner that provides a base for procedures such as retrieving information, drawing conclusions and making decisions. A distributed database is a variation in which information is distributed or spread over a number of sites that are connected through a communication network.

An independent distributed database (IDDB) system provides for update-anywhere capabilities. That is, all sites running the system can perform local, autonomous database updates, and the IDDB guarantees that these updates flow to all sites on the network. Each site's updates are treated equally and a site's update is only overridden in the case of a direct data conflict when, for the most part, the latest change in time will survive.

In more detail, an IDDB allows all users at all sites to work off-line with local data. Thus, all application transactions are against the local database only, and every site locally stores "all and only" the data it needs. This means that application transactions are not network-dependent and therefore do not suffer speed or availability problems when the network or remote sites are down or loaded. The on-line transactions only occur in the background, including a periodic synchronization between sites that transmit any changes to data that is of interest to the site. If the background operations are interrupted or the network is temporarily unavailable, the user does not see new changes made at other sites until the datalink is again established, but otherwise the user remains unaffected.

Oftentimes, it is desirable to process new or modified data from certain sites on the network differently from other sites. Consider, for example, a simplistic 'hub' and 'spoke' IDDB system, where the hub represents a centralized, authoritative server and a spoke represents a single user, potentially disconnected workstation. Currently, there are no known mechanisms that extend the applicability of the IDDB to installations requiring customized post-transaction data processing or intra-system conflict handling. Further, there are no known mechanisms for interfacing the IDDB to other unrelated database or messaging systems.

Also, various issues with implementing an IDDB system are typically resolved by changing the application code specific to the IDDB installation. For example, an installation where the application is changing from a centralized implementation to one of a distributed nature often has problems with records containing keys that will not be globally unique within the IDDB system.

What is needed, therefore, are techniques that extend the applicability of distributed database technology to installations requiring customized post-transaction data processing or intra-system conflict handling. There is also a need for techniques for interfacing a distributed database with other unrelated database or messaging systems.

SUMMARY OF THE INVENTION

One embodiment of the present invention provides a method for processing candidate data in a replication network. The method includes indicating user data in a local database is "candidate data" in response to that user data being created, deleted, or modified. The method continues with processing the candidate data pursuant to a candidate data approval process that specifies any necessary changes required to promote the candidate data to approved for replication status. The method may further include replicating approved candidate data to the rest of the replication network, and not rejected candidate data.

In one such embodiment, processing the candidate data pursuant to a candidate data approval process includes executing a resolution script to make changes required to approve the candidate data for replication. Prior to processing the candidate data pursuant to a candidate data approval process, the method may include detecting the candidate data using, for example, a candidate data flag that is set to indicate candidate data.

Indicating user data in a local database is candidate data may include, for example, creating or updating control data that corresponds to the user data, the control data indicating that the user data is candidate data. In such a case, the method may further include replicating approved candidate data to the rest of the replication network, using the control data to determine whether the candidate data is approved for replication or rejected from replication.

Another embodiment of the present invention provides a method for processing candidate data in a replication network. The particular method includes indicating user data in a local database is candidate data in response to that user data being created, deleted, or modified. The method continues with detecting the candidate data at a candidate data scanner process, and transmitting the candidate data to a candidate data resolver process. At the candidate data resolver process, the method continues with determining a candidate data approval process. The method then proceeds with processing the candidate data pursuant to the candidate data approval process, and replicating approved candidate data to the rest of the replication network, and not rejected candidate data.

In one such embodiment, determining the candidate data approval process includes generating a resolution script for promoting the candidate data to approved status, and returning the resolution script to the candidate data scanner process for execution. Here, processing the candidate data pursuant to the candidate data approval process may further include executing the resolution script to make changes required to approve the candidate data for replication. The resolution script indicates, for instance, that the candidate data is one of approved without modification, approved with specified modifications, or rejected.

The user data can be, for example, included in a database table record that is created, deleted, or modified by a user application. Indicating user data in a local database is candidate data may include, for example, creating or updating control data that corresponds to the user data, the control data indicating that the user data is candidate data. In one such case, the control data is included in a control table record that is created or updated in response to user data changes. In another such case, replicating approved candidate data to the rest of the replication network, may include using the control data to determine whether the candidate data is approved for replication or rejected from replication.

Another embodiment of the present invention provides a candidate data processing system. The system includes a change capture mechanism for indicating user data in a local database is candidate data in response to that user data being created, deleted, or modified. The system further includes a candidate data scanner module for detecting the candidate data, transmitting the candidate data to a candidate data resolving site, and processing the candidate data pursuant to a candidate data approval process. A candidate data resolver module is located at the candidate data resolving site, and is for determining the candidate data approval process. A replication engine may also be included, that replicates approved candidate data to the rest of the replication network, and not rejected candidate data.

In one such embodiment, the change capture mechanism includes a change capture module configured to create or update control data that corresponds to the user data, the control data indicating that the user data is candidate data. Here, the control data can be included in a control table record that is created or updated by the change capture module in response to user data changes. The control data can be used by the replication engine to determine whether the candidate data is approved for replication or rejected from replication.

The candidate data scanner module detects the candidate data, for example, using a candidate data flag that is set to indicate candidate data. Determining of the candidate data approval process by the candidate data resolver module may include, for instance, generating a resolution script for promoting the candidate data to approved for replication status, and returning the resolution script to the candidate data scanner module for execution. In one such case, the candidate data scanner module processes the candidate data pursuant to the candidate data approval process by executing the resolution script to make changes required to approve the candidate data for replication. The resolution script indicates the candidate data is, for example, one of approved without modification, approved with specified modifications, or rejected.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Techniques for extending the applicability of independent distributed database (IDDB) technology to installations requiring customized post-transaction data processing or intra-system conflict handling are disclosed. In addition, interfacing an IDDB to other unrelated database or messaging systems is enabled. An example independent distributed database system that can benefit from the principles of the present invention is described in detail in U.S. Pat. No. 6,446,092, which is herein incorporated in its entirety by reference.

In one particular embodiment of the present invention, newly added or changed data is prevented from being synchronized (replicated) until it has been "approved" via a specific process. Any new or changed records are marked as being "candidate data" initially. The normal synchronization processing (carried out by the replication engine) within the IDDB system ignores such data. In this way, the candidate data is not allowed to leave its source site, and potentially contaminate the rest of the IDDB (or replication network), until that data has been approved. The approval process is provided by a "candidate data scanner" that looks for the candidate data and provides it to a "candidate data resolver" for processing. The candidate data resolver is architected to provide for per installation extensibility.

This extensibility of the candidate data resolver provides for in-the-field resolution of previous technical challenges of IDDB systems, without having to modify the IDDB's core implementation. For instance, and as previously explained, it is oftentimes desirable to process new or modified data from certain sites on the network differently from other sites. In the case of a 'hub' and 'spoke' IDDB system (where the hub represents a centralized authoritative server, and a spoke represents a single user, potentially disconnected workstation case), updates originating at occasionally disconnected spoke nodes (e.g., a laptop used by a salesman) can be "cleansed" or otherwise approved before being synchronized with the hub database (to prevent contamination of the rest of the IDDB). This processing is extensible and customizable for each installation, as it is dependent on the application within which the IDDB system is working.

System Architecture

Figure 1:
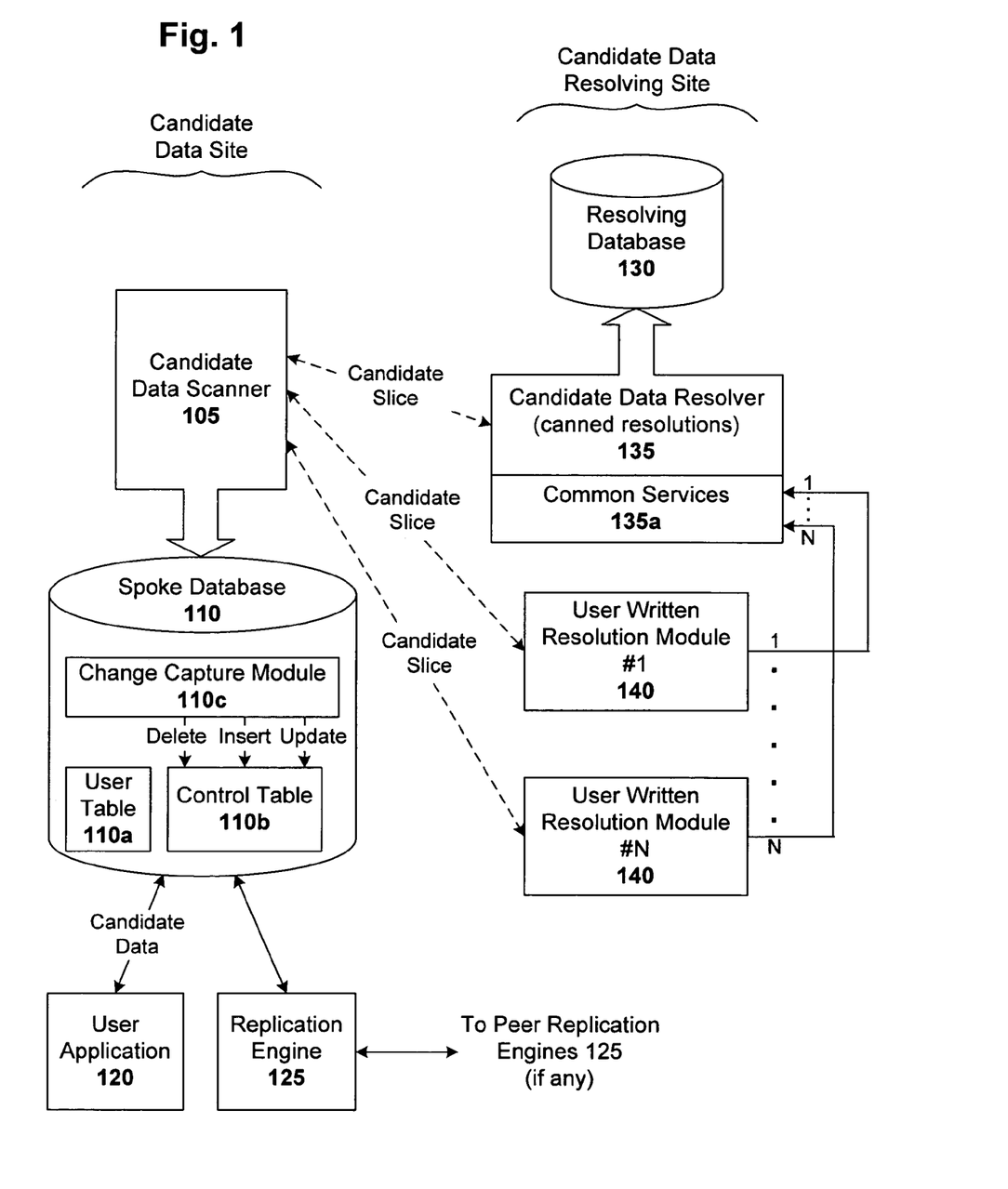
FIG. 1 is a block diagram of a candidate data processing system configured in accordance with one embodiment of the present invention.

FIG. 1 is a block diagram of a candidate data processing system configured in accordance with one embodiment of the present invention. As can be seen, the system includes a candidate data site and a candidate data resolving site.

The candidate data site includes a candidate data scanner module 105, a database 110 (which is a spoke of a distributed database), a user application 120, and a replication engine 125. The database 110 includes one or more user tables 110a (e.g., conventional relational database structure), and one or more control tables 110b. Each control table 110b is associated with a corresponding one of the user tables 110a. The database 110 also includes a change capture module 110c. The candidate data resolving site includes a resolving database 130 (which is a hub of the distributed database), a candidate data resolver module 135 that includes a number of "canned" (stock or standard) resolution modules and common services 135a, and a number (N) of user written or "custom" resolution modules 140.

The candidate data site is one of potentially many such candidate data sites, where candidate data is sent to one or more candidate data resolving sites, which may employ user extensible resolution modules to promote the candidate data into data that can subsequently be synchronized by an IDDB system. The replication engine 125 can communicate with other "peer" replication engines 125 at other candidate data sites (if any), if called for by a given replication scheme. Thus, the present invention is not intended to be limited to the embodiment shown in FIG. 1, and may include multiple candidate data sites and/or multiple candidate data resolving sites, as will be apparent in light of this disclosure.

In operation, a user accesses the candidate data site's local database 110 with the user application 120 (e.g., a specialized database application, such as a point-of-sales cash register, or an inventory control system), and updates, deletes, or inserts a record in table 110a of the local database 110. The change capture module 110c fires in response to this database record change, thereby causing the replication engine 125 to create (or update) a corresponding control record in the control table 110b. In particular, the replication engine 125 flags or otherwise marks that control record as being "candidate data." Candidate data is essentially updated, deleted, or inserted data that is ready for the pre-replication approval process, which determines whether that candidate data can be replicated into the remainder of the system as is, or whether that candidate data can be replicated into the remainder of the system after being cleansed or otherwise modified, or whether that candidate data is to be rejected (or ignored) from the replication process.

Periodically (e.g., at scheduled intervals or just prior to the next system replication process), the local candidate data scanner module 105 initiates the candidate data approval process. In more detail, the candidate data scanner module 105 detects the data (e.g., records or other transactions) marked as candidate data, and transmits that candidate data (e.g., via a conventional wired or wireless communication link) to the candidate data resolving site. In this particular embodiment, candidate "slices" are transmitted. A slice is one or more records (or other transactions) that the user has updated, deleted, or inserted via the user application 120. Note that a set of related records can be processed together during candidate data processing, much in the same way as a transaction commits a group of related records together. Here, the control rows for all the related records in a slice can carry the base ID of the root record in the slice. A single slice identifier can be used to identify such candidate sets. Note, however, that there are a number suitable ways to transmit the candidate data, whether as individual records or as groups of records or in some other form.

The transmitted data is then analyzed by one or more resolution modules at the candidate data resolving site. In one embodiment, the transmitted data is presented serially through the resolutions one at a time, with the result of each resolution process transmitted back to the candidate data scanner 105 for execution. In such a case, the candidate data could be, for example, processed via one of the canned resolutions of the candidate data resolver module 135. The candidate data resolver module 135 would then transmit a resolution response back to the candidate data scanner 105 for execution of that resolution. The candidate data could then be processed via one of the N user written resolution modules 140 of the candidate data resolver module 135. The user written resolution module 140 would then transmit a resolution response back to the candidate data scanner 105 for execution of that resolution, and so on, until the candidate data was approved or rejected.

Alternatively, the transmitted data could be presented serially through the resolutions one at a time, with the result of each resolution process aggregated to provide an overall resolution process that is then transmitted back to the candidate data scanner 105 for execution. Alternatively, the transmitted data could be presented in parallel to two or more of the resolutions, with the result of each resolution process transmitted back to the candidate data scanner 105 for execution. Use of serial or parallel communications between the resolution modules and the candidate data scanner 105 will depend on factors such as the desired implementation complexity, desired processing speed, and available processing capability. For most applications, a transmission through the resolutions one at a time, with the result of each resolution process transmitted back to the candidate data scanner 105 for execution will provide a sufficiently fast, low complexity implementation. Numerous transmit/response schemes will be apparent in light of this disclosure, and the present invention is not intended to be limited to any one such configuration.

In any case, the candidate data resolver module 135, and/or user-written resolution module(s) 140 receives the transmitted candidate data and then executes slice-specific logic, which generates a resolution script. This resolution script is then returned to the candidate data scanner module 105. The candidate data scanner module 105 then executes the script, which makes any necessary changes required for the approval of the candidate data. Note that is some cases, the candidate data may be accepted as is (with no modification). A resolution script contains a list of operations to be performed on the candidate data, such as modification of a column value in the source row of the candidate data record (including primary key fields), removal of the source row, insertion of a new record (in any table), various modifications to a control row, and cascade of foreign key change.

In the embodiment shown, each of the N user-written resolution modules 140 is allowed to make certain function calls to an internal application program interface (API) containing common services 135a of the candidate data resolver module 135. This internal API is configured to provide each user-written resolution module 140 the ability to perform certain standard tasks, such as perform a database lookup, provide caching services (for locally unique ID to globally unique ID mappings), write a message to a log file of the candidate data resolver module 135, and other such functions as may be desirable given a particular application.

The resolving database 130 is effectively a central or hub database, and includes all replicated data of the system.

Variations on this particular embodiment will be apparent in light of this disclosure. For instance, the functionality of some modules may be integrated with other modules of the system, or de-integrated. In one such embodiment, the candidate data scanner module 105 can be integrated into the database 110. Likewise, the change capture module 110c can exist as a discrete module. Also, the replication engine 125 can be local to the candidate data site and communicate with its peers over a communication link (as shown), or remote to the candidate data site (e.g., at the candidate resolving site or some other location). Also, other embodiments may only include canned or custom resolution modules (as opposed to both).

Components and other features of the system shown in FIG. 1 will now be discussed in more detail. As described below, the modules can be implemented in hardware. For example, a computer including a processor and a memory can be configured to implement the modules in system of FIG. 1. In one embodiment, the modules are implemented in form of computer instructions stored in a computer readable storage medium when executed by a processor cause the processor to implement the functionality of the module.

Candidate Scanner Module

The candidate data scanner module 105 can be implemented, for example, as a software process (e.g., server or computer based process, or an embedded process). However, other embodiments can be implemented in hardware (e.g., using gate level logic) or with a combination of hardware and software, as will be apparent in light of this disclosure.

In any case, the candidate data scanner module 105 periodically activates and loads (or otherwise accesses) the candidate data configuration. In one particular embodiment, this includes reading the user table 110*a* and the corresponding control table 110*b*. Alternatively, the reading could be done on a record by record basis, or as a set of records or other transactions. The candidate data scanner module 105 then scans rows of each control table 110*b* (or other transactions) to identify candidate data rows of the user table 110*a* (e.g., by searching for flags indicative of candidate data rows), and gathers up all the candidate data found.

Each slice (one or more records or other transactions) found is then bundled into a simple object access protocol (SOAP) request and transmitted to the candidate data resolver module 135 (or a user-written resolution module 140), which returns a resolution script. Recall that SOAP is an XML based protocol for information exchange in a decentralized and distributed environment. Other suitable communication protocols can be used here as will be apparent in light of this disclosure, and the present invention is not intended to be limited to an XML-based exchange using object-oriented programming. Note, however, that SOAP/XML information exchanges are standards-based, and therefore enable customers to more easily implement their own resolution modules using standard tools. In this sense, using standards-based tools may be more attractive to the end-user.

The candidate data scanner module 105 then executes the resolution script, which causes the candidate data to be "approved" (ready for replication) or rejected. Note that approving the candidate data may require certain modifications or other processing of the data, in accordance with the resolution script.

Control Tables

Figure 2A:
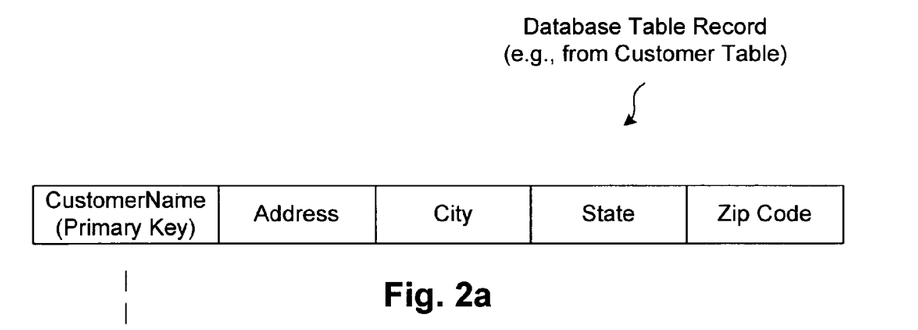
FIG. 2a illustrates a typical record of a database table.
Figure 2B:
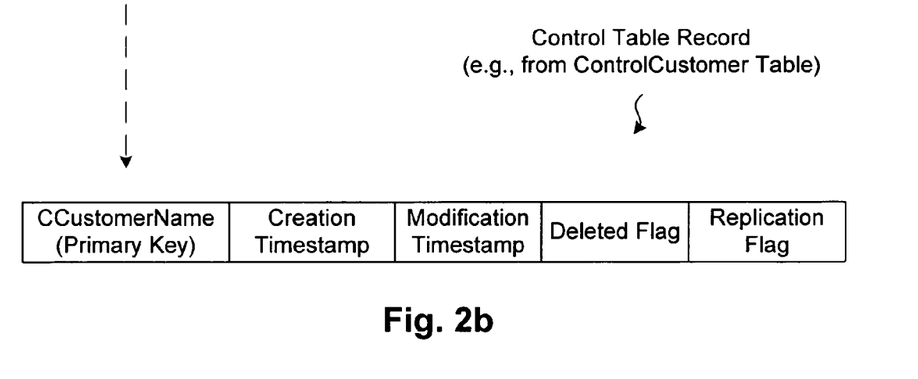
FIG. 2b illustrates a record of a control table configured in accordance with one embodiment of the present invention.

FIG. 2*a* illustrates a typical record of a database user table 110*a*, and FIG. 2*b* illustrates a record of a control table 110*b* configured in accordance with one embodiment of the present invention.

A control table 110*b* stores replication information about the rows in its associated user table 110*a*. In the particular embodiment shown, the control table 110*b* has a row for each row of the user table 110*a*. Each table row is a record. Each record of the control table 110*b* provides details pertaining to the modifications made to the corresponding row of the user table 110*a*. In one such embodiment, each user table 110*a* has a corresponding control table 110*b* having the same table name prefixed by "Control". For example, for a user table 110*a* called "Customer", there is a control table 110*b* called "ControlCustomer."

In the embodiment shown, each control table 110*b* row contains information including the Primary Key value (which in this example is the customer name), Creation Timestamp (e.g., date and time), and Modification Timestamp of the corresponding record of the user table 110*a*. Each control table 110*b* row also contains a Deleted Flag, which indicates whether the corresponding record of the user table 110*a* was deleted. Each control table 110*b* row also contains a Replication Flag, which indicates whether the record should be replicated or if that record is candidate data. If the record is candidate data, then it is not immediately replicated. Rather, that record will be submitted to the pre-replication approval process.

For example, consider the example user table 110*a* called Customer shown in FIG. 2*a*. This table has the following fields: CustomerName (which is the primary key); Address; City; State; and Zip Code. The corresponding control table 110*b* could then be called ControlCustomer, and is shown in FIG. 2*b*. In this example embodiment, the control table 110*b* has the following fields: CCustomerName (matching field to the CustomerName in the user table 110*a*, and used as the control table's primary key); Creation Timestamp (record's creation timestamp); Modification Timestamp (record's last modification timestamp); Deleted Flag (e.g., set to N if record is not deleted or to D if is deleted); and Replication Flag (e.g., set to R if normal replication applies or to C if pre-replication candidate data processing applies).

As previously explained, the change capture module 110*c* fires in response to this database record change, thereby updating a corresponding control record in the control table 110*b*. Thus, both the database table 110*a* records and the control table 110*b* records are established and maintained updated as necessary. Note, however, that it may be desirable to exclude certain database table records from the replication process (for whatever reason). For such non-replicated records, no corresponding control table 110*b* records need be established; but doing so would simplify the process of changing the status of the those records from non-replicated to replicated, if so desired.

Change Capture Module

As previously explained, the replication engine 125 tracks changes to the database 110 through control tables 110*b*, and via a set of data change triggers provided by the change capture module 110*c*. This module 110*c* can be implemented, for example, as a software process (e.g., discrete module or integrated into the database 110). However, other embodiments can be implemented in hardware (e.g., using gate level logic) or with a combination of hardware and software, as will be apparent in light of this disclosure. In embodiment shown, the change capture module 110*c* updates the control data directly—the logic for this is encapsulated in the data change triggers themselves. The triggers are generated specifically for the target database 110 by the replication engine 125.

In more detail, and with reference to the example embodiment shown in FIG. 1, each user table 110*a* is associated with three data change triggers: insert, update and delete triggers. In one particular embodiment, these data change triggers are automatically created when a customer selects a database table 110*a* for replication (e.g., using a replication designer or other such mechanism). Alternatively, the data change triggers can be automatically created when the database table 110*a* is created, or at the first time a record of the table 110*a* is modified (e.g., by the inserting, deleting, or updating of a record).

In any case, when a new row is created in user table 110*a*, the insert trigger of the change capture module 110*c* fires and creates a corresponding record in the corresponding control table 110*b*, with the Creation Timestamp and Modification Timestamp fields of that control table record set to the current database date/time. Also, when an existing row is updated in user table 110*a*, the update trigger of the change capture module 110*c* fires and changes the Modification Timestamp field of the corresponding control table 110*b* record. Likewise, when an existing row is deleted from the user table 110*a*, the delete trigger of the change capture module 110*c* fires, which sets the Deleted Flag of the corresponding control table 110*b* record. The replication engine 125 uses the timestamp and flag information of the control table(s) 110*b* to determine which records of the database table(s) 110*a* need to be transmitted during a normal replication session.

If candidate data processing is enabled, then the three data change triggers behave slightly differently. For example, candidate data processing can be enabled by marking a user table 110*a* for candidate processing using a table property or configuration field. Alternatively, candidate data processing can automatically be performed (always enabled). In any such case, if candidate data processing is enabled, and a record of a user table 110a is modified (e.g., by the inserting, deleting, or updating of a record), then the three data change triggers of the change capture module 110c still perform all the same tasks as just described, but they also set the Replication Flag field of the corresponding control table 110b record to, for example, C (for candidate data). Setting this flag to C tells the replication engine 125 that the data is candidate data, which should not be replicated until the approval process has been carried out. Note that the candidate data scanner module 105 can identify candidate data by this field. Further note that after the approval process is carried out, the Replication Flag field can be set back to N (normal), which indicates to the replication engine 125 that the data may be replicated.

Resolution Scripts

As previously discussed, a resolution script is a sequence of operations that can be executed in order to promote candidate data to an "approved" status. Table 1 illustrates example resolution commands and format that are available for use in a resolution script:

TABLE 1

| Command | Description | Parameter |
| --- | --- | --- |
| DELETE | Deletes the record specified | Primary key |
| MAKELOCAL | Makes the specified record local (unreplicated) | Primary key |
| MODIFY | Changes field values in the specified record | Primary key, Changed records |
| INSERT | Inserts a new record. | Primary key, New records |
| CHANGEPK | Changes a record's primary key | Old primary key, new primary key |
| COMMIT | Commits the current set of pending transactions | <none> |
| SQL | Allows execution of arbitrary SQL statements | SQL Statement (executes at candidate data site) |

Candidate Data Resolver Module

Like the candidate data scanner module 105, the candidate data resolver module 135 can be implemented, for example, as a software process (e.g., server or computer based process, or an embedded process), or in hardware (e.g., using gate level logic), or with a combination of hardware and software, as will be apparent in light of this disclosure. In one particular embodiment, each of the candidate data scanner module 105 and candidate data resolver module 135 are written using .NET as managed code, thereby enabling use of the services available in .NET for quickly writing web services. In such an embodiment, note that by publishing web service definition language (WSDL) for the candidate data resolver module 135 interfaces, the user can use whichever tools and languages he wishes to write his own resolution modules. As will be apparent in light of this disclosure, other programming/definition languages can be used to carryout the functionality described herein, and the present invention is not intended to be limited to any one such embodiment. In one particular embodiment, the candidate data scanner module 105 and the candidate data resolver module 135 run on all the same platforms as the replication engine 125. Such platforms include, for example, Windows, Linux, and AIX.

In some circumstances, it may be required that candidate data processing happens at a single (central) candidate resolving site. This is because, for instance, the candidate data resolver module 135 may require a "memory" of how certain updates have been resolved. Whenever such a memory is required, the candidate data resolver module 135 can write information about the resolution to its local database 130, so that subsequent resolutions can be aware of past operations. In such a case, a centralized resolver can be used. This will prevent the situation where a candidate update resolved at one candidate data resolver module 135 while another candidate data resolver module 135 is simultaneously resolving a different candidate update in a manner that creates some sort of a conflict. Note, however, that a centralized resolver is not needed for all use cases (e.g., such as those not requiring memory of previous resolutions or those that are not at risk of causing conflicts).

As previously discussed, the candidate data resolver module 135 can be configured with a set of "canned" resolutions for common problems. The following are example canned resolutions:

LUID Support: A canned resolution that assigns a globally unique identifier (GUID) to a numeric column for which a user application is only supplying a locally unique identifier (LUID) value.

One-way Replication: In this scenario, the user only wants changes to be propagated from a central set of sites out to certain spokes. If any of these spoke sites attempt to change the local data, it should be reverted back to its original state. To perform this function, all tables with this requirement will be configured to allow tracking of candidate data at design time. At run-time, all the no-changes-allowed sites will be configured to track all operations as candidate data (inserts, updates and deletes), and they will also be configured to call a Revert Changes API at the candidate data resolving site. The Revert Changes API can be a standard resolution API included in the common services 135 of the candidate data resolver module 135. For each candidate data record change passed in, the Revert Changes API will look up the current value of the record using that record's primary key. If the change is an insert operation, a DELETE command will be added to the resolution script. If the change is a delete operation, an INSERT command will be added to the resolution script. If the change is an update, a MODIFY command (containing only the current values of the modified record/fragments) will be added to the resolution script.

Insert Conflicts: Although it is generally not practical to develop a generalized solution for insert conflicts (since there are many ways to resolve them), a resolution can be implemented as a "common" solution to the specific problem of a conflict due to a collision in a secondary unique index. The module is configured with the names of the fields in the secondary unique index. From that starting point, the value could be verified as not currently in use (which would cause the insert to be approved). If the value was currently in use, cause the newly-inserted record to be removed.

No Primary Key: This use case can be solved by having the user add an auto-increment column to the table in question (e.g., either using an identity property, or by assigning a default value from a SEQUENCE). The table would also need a unique index applied to this new column. Once this has been done, a table with a LUID primary key is provided (see LUID Support canned resolution).

Manual Replication: This canned resolution logs the changed records centrally so that they can be purged using the One-way Replication canned resolution. Note that this resolution could be integrated into the One-way Replication canned resolution as an option.

User Written Resolution Modules

While many of the resolving modules used by the candidate data resolver module 135 can be canned, certain solutions require knowledge of the customer's business rules. Thus, a framework is provided for easily writing and debugging customer-written modules, and for accessing the database 130 local to the candidate data resolver module 135. Such access is desirable, for example, because LUID handling may require writing to the local database 130, so that the candidate data resolver module 135 can preserve the knowledge that it has associated a particular record with a specific GUID value. Also, for Insert Conflicts, a customer-written resolver may need to access the local database 130 of the candidate data resolver module 135 to detect that the conflict even exists. The framework can also include template modules that the customer can use when writing their custom code.

Note that resolution functions may require different levels of information. For example, an LUID handler may only require primary key fields; an insert handler may require the primary key and secondary unique index values. Thus, it may be desirable to configure on a per-handler basis the level of detail to be sent: primary key only, changed fields only, whole record, etc. This will minimize the amount of data that is transmitted for processing by the candidate data scanning module 105 and the resolution modules 135 and 140.

Further note that, since the candidate data scanning module 105 and the candidate data resolver module 135 exchange data from the customer's database, a security mechanism can be provided to ensure that the communications between these processes is secure. For instance, conventional mechanisms can be provided that enable the candidate data scanning module 105 and candidate data resolver module 135 to authenticate each other prior to data exchange, and/or to encrypt the communications link between them.

Replication Engine

The replication engine 125 can generally be implemented, for example, using conventional technology in conjunction with the functionality described herein, including the ability to interface with the change capture module 110c, and to generate and maintain control table(s) 110b having a Replication Flag field to indicate whether the corresponding user data record contains candidate data. In addition, the replication engine 125 is programmed or otherwise configured to ignore records containing candidate data (e.g., as indicated by the Replication Flag field). Only data associated with control records having the Replication Flag field set to N (normal) will be replicated.

Other implementation functionality that can be carried out by the replication engine will be apparent in light of this disclosure, such as the ability to mark user data and/or control tables to enable candidate data processing (e.g., by setting a table property). For instance, a table property "allowCandidate" can be set to true if candidate data is selectable for that table. If false, Table::allowCandidate will indicate that such processing cannot be selected for the table. Note that having such a flag will allow downstream code to make simplifying assumptions when it is known that no candidate data processing is ever required. The default value for Table::allowCandidate can be false. Since all tables in a transaction may be processed together during candidate data processing, one embodiment displays a warning if tables referenced in a transaction have different Table::allowCandidate values.

Methodology

Figure 3:
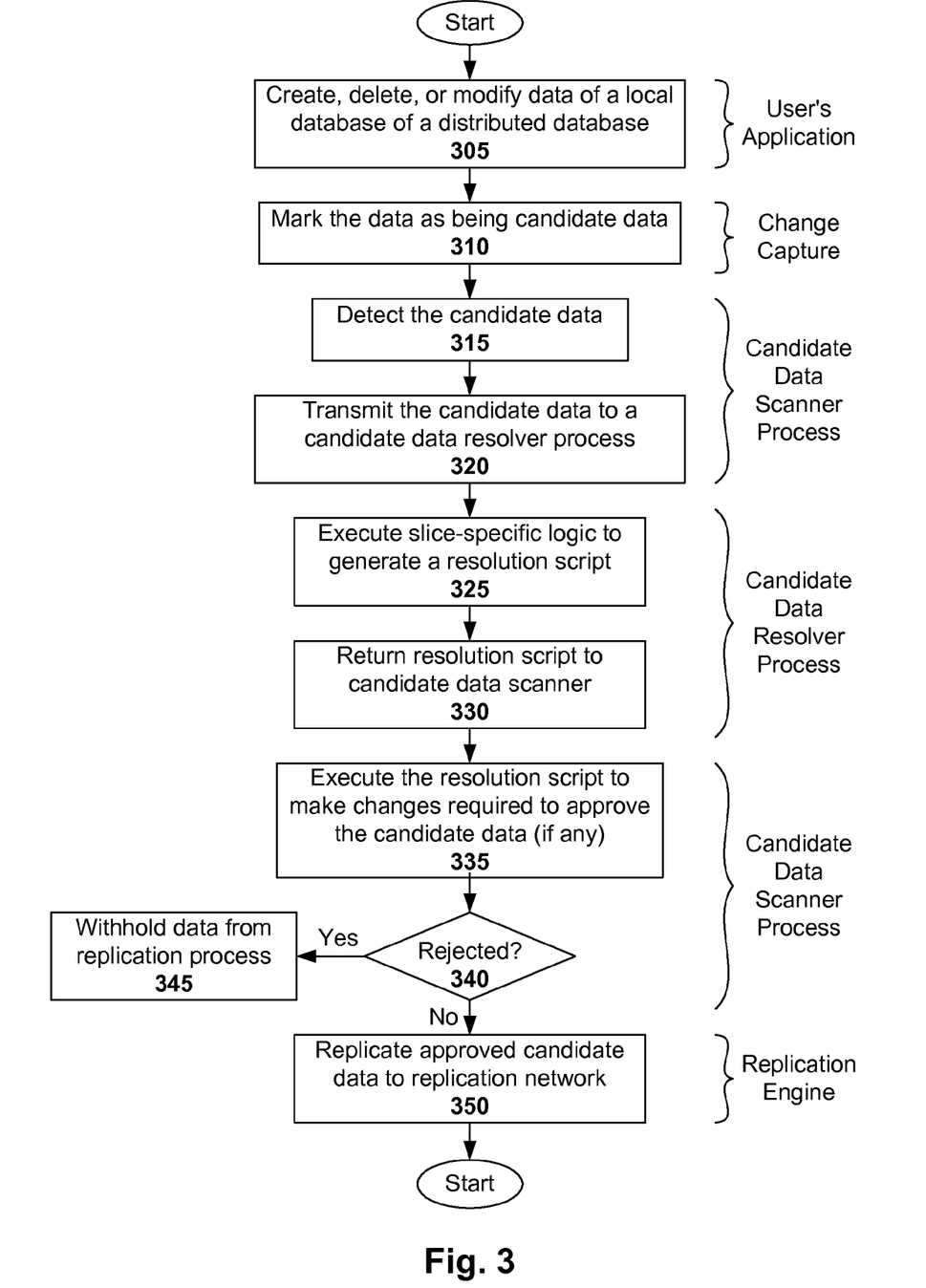
FIG. 3 illustrates a method for processing candidate data in a replication network in accordance with one embodiment of the present invention.

FIG. 3 illustrates a method for processing candidate data in a replication network in accordance with one embodiment of the present invention. This method can be carried out, for example, by the system shown in FIG. 1, and need not be carried out in its entirety. For instance, one embodiment of the method may include only functionality associated with the candidate data scanner process, while another embodiments of the method may include only functionality associated with the candidate data resolver process, or with the replication engine.

The method begins with creating, deleting, or modifying 305 data of a local database of the replication network. As can be seen, this particular function is attributed to some user application that is manipulating data within the local database. The method continues with marking 310 the data as being candidate data. In the embodiment shown, this "marking" is carried out by a change capture module, which is configured to indicate new or modified records include candidate data, for example, using a corresponding control table record having a candidate data flag field, as previously discussed.

The method continues with candidate data scanner processing, which includes detecting 315 the candidate data, and transmitting 320 the candidate data to a candidate data resolver process. The detecting can be carried out, for instance, periodically (e.g., on a set schedule) or each time candidate data is marked as such. In one particular embodiment, the detecting is achieved using a flag that is set to indicate records containing candidate data. The flag may be, for instance, in the user database table record itself, or in a corresponding control table record as previously described. The transmitting can be accomplished with a wired or wireless transmission, using conventional communication media and protocols.

The method continues with candidate data resolver processing, where the candidate data is analyzed to determine whether the data is to be approved "as is" or with modification, or rejected. In the embodiment shown, this processing includes executing 325 slice-specific logic to generate a resolution script as previously described, and returning 330 the resolution script to the candidate data scanner process for execution. Recall that the slice can include one or more database table records (or other such transactions) that each include candidate data.

The method returns to candidate data scanner processing, which includes executing 335 the resolution script to make changes required to approve the candidate data (if any). Recall that if the candidate data is approved "as is" or is rejected, then no changes are made. Note, however, that if the candidate data is rejected, then it could be removed from the database, or reverted to its original value by the resolution script. The method continues with determining 340 whether the candidate data is rejected or not. If so, the method continues with holding 345 the candidate data from the replication process. As such, the data remains local to the candidate data site.

If candidate data is not rejected, then the method continues with replicating the approved data to the replication network. This replication process can be carried out using conventional or custom replication techniques, so long as the replication process does not replicate candidate data that is not yet approved (or has been rejected).

Example Use Cases

A number of example use cases will now be described. These example cases are not intended as limitations on the present invention, but are provided to show real life applications of various embodiments of the present invention. The following abbreviations are used throughout the example work flows associated with the use cases: Change Capture is the data change capture mechanism previously described (e.g., change capture module 110c and/or control table 110b); CDS is the candidate data scanning module previously described; CDR is the candidate data resolver module previously described; RE is the replication engine previously described; and T1-T7 are each tables in a distributed relational database.

Use Case 1—Generalized LUID Support, Scenario A: A customer has a table T1 that has a locally-unique integer identifier as its primary key (e.g., an integer field tied to an Oracle SEQUENCE). The customer wants to distribute T1, but is unable to modify the application.

The example work flow proceeds as follows:
1. Customer: inserts a new record in T1. Existing application logic assigns a locally-unique value to the new record.
2. Change Capture: marks new record as candidate data.
3. CDS: Picks up new record and transmits it to the CDR.
4. CDR: Receives record and runs user-written resolution component, or "canned" LUID-handling resolution module. The component assigns a globally-unique ID to the new record.
5. CDR: Sends a list of commands (resolution script) to the CDS telling it to change the new record's primary key (and that of its control table).
6. CDS: Receives the commands and executes them. Record is now "approved".
7. RE: Replicates the new record into the replication network.

Use Case 1—Generalized LUID Support, Scenario B: A customer has a table T1 that has a locally-unique string identifier as its primary key (e.g., user name). The customer wants to distribute T1, but is unable to modify the application.

The example work flow proceeds as follows:
1. Customer: inserts a new record in T1. Existing application logic assigns a locally-unique value to the new record.
2. Change Capture: marks new record as candidate data.
3. CDS: Picks up new record and transmits it to the CDR.
4. CDR: Receives record and runs user-written resolution component. The component checks for matching values in the central database and appends a numeric value ensuring the uniqueness of the key value.
5. CDR: Sends a list of commands (resolution script) to the CDS telling it to change the new record's primary key (and that of its control table). Note that the CDR may need to write the new record to its local database, so that other sites' new records can be correctly resolved.
6. CDS: Receives the commands and executes them. Record is now "approved".
7. RE: Replicates the new record into the replication network.

Note that both scenarios A and B of use case 1 involve changing a customer's primary key field after the transaction is committed to the local database, but before it is allowed to replicate out from the local site. If the table's primary key is meaningful to the customer, such as a value that is immediately printed (e.g., an invoice ID) or given to the customer for identification (e.g., a user name or email address), then this may not be a useful solution for them. Further note that a canned resolution module can be provided for scenario A, and a sample implementation can be provided for scenario B.

Use Case 2—One-way Replication, Scenario: A customer has a table T2 that he does not wish to be alterable from specific "read-only" sites in his replication network. Any records changed accidentally at these sites should be reverted to their original states.

The example work flow proceeds as follows:
1. Read-only site: Record A is changed, record B is deleted and record C is inserted.
2. Change Capture: marks changed/new records as candidate data.
3. CDS: Picks up new candidate records and transmits them to the CDR.
4. CDR: Receives records and runs canned or user-written resolution component. The component looks up the current value of records A and B and generates update commands to revert them to their original state. A delete command for record C is also generated.
5. CDR: Transmits commands (resolution script) to the CDS.
6. CDS: Receives the command and executes them. Database is now in its original state.

Use Case 3—Insert Conflicts (on "Secondary Unique Index"), Scenario: A customer has an Employee table with a GUID primary key (EmployeeNumber). However, this table also contains a second field that is uniquely indexed. (SocialSecurityNumber). Both fields must be unique, and if two employees are ever inserted with the same SocialSecurityNumber, it is an error that is generally resolved by merging into a single record.

The example work flow proceeds as follows:
1. Customer: Inserts new Employee record for an employee that already exists elsewhere in the replication network ((just not locally).
2. Change Capture: Marks new record as candidate data.
3. CDS: Picks up the new candidate row and transmits it to the CDR.
4. CDR: Receives record and runs user-written resolution component. The component detects the duplication.
5. CDR: Sends a list of commands (resolution script) to the CDS telling it to change the new record's primary key (and that of its control table) to match the existing record (other data fields could be likewise modified). Note that the CDR may need to write the new record to its local database, so that other sites' new records can be correctly resolved.
6. CDS: Receives the commands and executes them. Record is now "approved".
7. RE: Replicates the new record into the replication network.

Recall that a set of related candidate records may need to be resolved as a single unit. For example, in Use Case 3, an Employee record may have related child records. When the candidate Employee record is merged into the existing one, these child records would be orphaned unless their foreign key fields are changed to match. For this reason, the CDS needs to be able to cascade such changes through to any child records (as defined by the foreign key relationships in the application's database).

Use Case 4—No Primary Key, Scenario: A customer has a table T5 that has no primary key (table contains audit information which is always inserted, never updated). User's application cannot be modified, but it is allowable to add an integer column to the end of the table, with a default value so that existing INSERT statements are not affected. At designtime, the new column is added to the end of the table. A default value is assigned to the column, so that existing INSERT statements will continue to function. One method to accomplish this is to create the column default so that a LUID will be assigned to each new row (using an auto-increment property, a SEQUENCE, etc.). At this point, the problem is now reduced to Use Case 1, and can be solved accordingly.

Use Case 5—State Changes, Scenario: A customer has a table T6 that contains quotes and invoices. When the record is in the quote stage, it can be freely edited. However, once the contract has been negotiated, the quote is promoted to an invoice that can no longer be altered.

The example work flow proceeds as follows:
1. Customer: Adds details to a quote that has already been promoted to an invoice at another site.
2. Change Capture: Marks changed record as candidate data.
3. CDS: Picks up the candidate row and transmits it to the CDR.
4. CDR: Receives record and runs user-written resolution component. The component detects the invalid change.
5. CDR: Sends a list of commands (resolution script) to the CDS telling it to revert the changed row to its old value (and that of its control table).
6. CDS: Receives the commands and executes them. Record is now reverted.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer readable storage medium comprising instructions that, when executed by a processor, cause the processor to perform a method comprising:
   indicating user data in a local database is candidate data in response to that user data being created, deleted, or modified, wherein the local database is in a distributed database system and the distributed database system also comprises a candidate data resolving site;
   detecting the candidate data and transmitting the candidate data to the candidate data resolving site;
   receiving, at the local database from the candidate data resolving site, a sequence of operations in a resolution script, wherein the sequence of operations is determined by the candidate data resolving site, and the determined sequence of operations are for promoting the candidate data to approved for replication status;
   processing the candidate data within the local database pursuant to the resolution script to modify the local database by executing the resolution script to make changes required to approve the candidate data for replication; and
   replicating approved candidate data to another database in the distributed database system, and not replicating rejected candidate data.

2. The computer readable storage medium of claim 1 wherein the user data is included in a database table record that is created, deleted, or modified by a user application.

3. The computer readable storage medium of claim 1 wherein the method further comprises creating or updating control data that corresponds to the user data, the control data indicating that the user data is candidate data.

4. The computer readable storage medium of claim 3 wherein the control data is included in a control table record that is created or updated in response to user data changes.

5. The computer readable storage medium of claim 3 wherein the control data is used to determine whether the candidate data is approved for replication or rejected from replication.

6. The computer readable storage medium of claim 1 wherein detecting the candidate data comprises using a candidate data flag that is set to indicate candidate data.

7. The computer readable storage medium of claim 1 wherein the resolution script indicates the candidate data is one of approved without modification, approved with specified modifications, and rejected.

8. A method for processing candidate data in a distributed database system, comprising:
   indicating user data in a local database is candidate data in response to that user data being created, deleted, or modified;
   detecting the candidate data at a candidate data scanner module;
   transmitting the candidate data to a candidate data resolver module;
   at the candidate data resolver module, determining a sequence of operations in a resolution script, wherein the determined sequence of operations are for promoting the candidate data to approved for replication status;
   processing the candidate data within the local database pursuant to the resolution script, thereby modifying the local database by executing the resolution script to make changes required to approve the candidate data for replication; and
   replicating approved candidate data to another database in the distributed database system, and not replicating rejected candidate data.

9. The method of claim 8 wherein detecting the candidate data includes using a candidate data flag that is set to indicate candidate data.

10. The method of claim 8 wherein the resolution script indicates the candidate data is one of approved without modification, approved with specified modifications, or rejected.

11. The method of claim 8 wherein the user data is included in a database table record that is created, deleted, or modified by a user application.

12. The method of claim 8 wherein indicating user data in a local database is candidate data includes creating or updating control data that corresponds to the user data, the control data indicating that the user data is candidate data.

13. The method of claim 12 wherein the control data is included in a control table record that is created or updated in response to user data changes.

14. The method of claim 12 wherein replicating approved candidate data to another database in the distributed database system, includes using the control data to determine whether the candidate data is approved for replication or rejected from replication.

15. A system including a processor and a memory for processing candidate data in a distributed database system comprising a local database and a candidate data resolving site, the system, comprising:
   a change capture mechanism indicating user data in a local database is candidate data in response to that user data being created, deleted, or modified;
   a candidate data scanner for receiving, at the local database from the candidate data resolving site, a sequence of operations in a resolution script, wherein the sequence of operations is determined by the candidate data resolving site and the determined sequence of operations are for promoting the candidate data to approved for replication status, and
   processing the candidate data within the local database pursuant to the resolution script by executing the resolution script to make changes required to approve the candidate data for replication; and
   a replication engine for replicating approved candidate data to another database in the distributed database system, and not replicating rejected candidate data.

16. The system of claim 15 wherein, the candidate data scanner is configured for:
  detecting the candidate data using a candidate data flag that is set to indicate candidate data.

17. The system of claim 15 wherein indicating user data in a local database is candidate data includes creating or updating control data that corresponds to the user data, the control data indicating that the user data is candidate data.

18. The system of claim 17 wherein replicating approved candidate data comprises:
  replicating approved candidate data to another database in the distributed database system, using the control data to determine whether the candidate data is approved for replication or rejected from replication.

19. The computer readable storage medium of claim 1 wherein the candidate data resolving site comprises a resolving database and the resolving database comprises replicated data in the distributed database system.

20. The system of claim 15 wherein the user data is included in a database table record that is created, deleted, or modified by a user application.

21. The system of claim 17 wherein the control data is included in a control table record that is created or updated in response to user data changes.

22. The system of claim 15 wherein the resolution script indicates the candidate data is one of approved without modification, approved with specified modifications, and rejected.

23. The system of claim 15 wherein the candidate data resolving site comprises a resolving database and the resolving database comprises replicated data in the distributed database system.

* * * * *